United States Patent [19]
Zunkel et al.

[11] Patent Number: 6,012,521
[45] Date of Patent: Jan. 11, 2000

[54] DOWNHOLE PRESSURE WAVE GENERATOR AND METHOD FOR USE THEREOF

[75] Inventors: Gary D. Zunkel; Thomas T. Hansen, both of Ames, Iowa

[73] Assignee: Etrema Products, Inc., Ames, Iowa

[21] Appl. No.: 09/021,025

[22] Filed: Feb. 9, 1998

[51] Int. Cl.[7] ............................................. E21B 43/25
[52] U.S. Cl. ..................... 166/249; 166/66.4; 166/66.5; 166/177.1; 166/177.6
[58] Field of Search ................................. 166/65.1, 66.4, 166/66.5, 177.1, 177.2, 177.6, 177.7, 249; 210/170, 747; 405/128

[56] References Cited

U.S. PATENT DOCUMENTS

| | | | |
|---|---|---|---|
| 3,322,196 | 5/1967 | Bodine, Jr. | 166/177.1 |
| 3,578,081 | 5/1971 | Bodine | 166/249 |
| 3,583,677 | 6/1971 | Phillips . | |
| 3,718,186 | 2/1973 | Brandon | 166/248 |
| 3,970,146 | 7/1976 | Keenan, Jr. | 166/249 |
| 4,407,365 | 10/1983 | Cooke, Jr. | 166/249 |
| 4,469,175 | 9/1984 | Massa | 166/177.2 |
| 4,512,402 | 4/1985 | Kompanek et al. | 166/249 |
| 4,544,031 | 10/1985 | Bodine | 166/249 X |
| 4,632,215 | 12/1986 | Farris . | |
| 4,639,905 | 1/1987 | Goodloe . | |
| 4,673,037 | 6/1987 | Bodine | 166/249 |
| 4,702,315 | 10/1987 | Bodine | 166/249 |
| 4,788,467 | 11/1988 | Plambeck | 166/249 X |
| 4,805,727 | 2/1989 | Hardee et al. . | |
| 4,850,449 | 7/1989 | Cheung . | |
| 4,874,061 | 10/1989 | Cole . | |
| 4,993,001 | 2/1991 | Winbow et al. . | |
| 5,101,899 | 4/1992 | Hoskins et al. | 166/248 |
| 5,109,698 | 5/1992 | Owen | 166/249 X |
| 5,361,837 | 11/1994 | Winbow | 166/249 |
| 5,418,335 | 5/1995 | Winbow . | |
| 5,449,249 | 9/1995 | Husten | 405/128 |
| 5,458,860 | 10/1995 | Morris et al. | 423/155 |
| 5,826,653 | 10/1998 | Rynne et al. | 166/245 |
| 5,836,389 | 11/1998 | Wagner et al. | 166/249 |

OTHER PUBLICATIONS

Etrema Products, Inc., "Etrema Terfenol–D Magnetostrictive Actuators," (1993 or earlier), 6 pages.

Goodfriend, et al., "High force, high strain, wide band width linear actuator using the magnetostrictive material, Terfenol–D," (1993 or earlier), 12 pages.

Etrema Products, Inc., "Etrema Terfenol–D Magnetostrictive Actuators," (Dec. 31, 1995 or earlier) 4 pages.

Butler, J.L., "Application Manual for the Design of Etrema Terfenol–D Magnetostrictive Transducers," (1988) pp. 1–67.

Miller, "High Force, High Strain, Wide Bandwidth Linear Actuators Using the Magnetostrictive Material Terfenol–D," (1991) Proceedings on the Conference on Recent Advances in Active Control of Sound and Vibration, Technomic Publishing Co., Inc., Lancaster, PA, 9 pages.

Edge Technologies, Inc., Etrema Products Division, "Magnetostrictive Actuators," (Date unknown) 3 pages. (undated).

(List continued on next page.)

*Primary Examiner*—George Suchfield
*Attorney, Agent, or Firm*—Flehr Hohbach Test Albritton & Herbert LLP

[57] ABSTRACT

A pressure wave generator for use down a bore hole having fluid therein adjacent a hydrocarbon-containing formation. The generator includes an elastomeric member sized for disposition in the bore hole. A periodic compressive force is exerted on the elastomeric member in a first direction so as to cause the elastomeric member to expand in a second direction and thus produce pressure waves in the fluid to increase the effective permeability of the hydrocarbon-containing formation. A method for using the generator is provided.

28 Claims, 3 Drawing Sheets

OTHER PUBLICATIONS

Edge Technologies, Inc., "Magnetostrictive Actuators," (Published in 1992, estimate) 4 pages.

Beresnev, A., et al., "Elastic–wave stimulation of oil production: A review of methods and results," (Jun. 1994) Geophysics, vol. 59, No. 6, pp. 1000–1017.

Ogura, K., et al., "Downhole Seismic Source Based on New Concept," pp. 325–341. (undated).

Winbow, G.A., "Seismic sources in open and cased boreholes," (Jul. 1991) Geophysics, vol. 56, No. 7, pp. 1040–1050.

DOWNHOLE PRESSURE WAVE GENERATOR AND METHOD FOR USE THEREOF

This invention pertains generally to downhole apparatus for enhancing the flow of fluid in a hydrocarbon producing well and, more particularly, to downhole apparatus for generating pressure waves to enhance the flow of fluid in a hydrocarbon producing well.

Downhole tools have been provided for producing pressure waves in fluid-containing bore holes to enhance the flow of fluid from adjacent production zones. Many of these tools, such as the tool disclosed in U.S. Pat. No. 4,512,402, are intended to operate at their resonant frequency. Unfortunately, these tools suffer from a number of disadvantages. For example, some of the tools are hollow in construction and the resonant frequencies thereof are thus sensitive to pressure changes which accompany elevational changes of the tools in a bore hole. The transducers which drive these tools are often contained inside the pressure wave producing member such that the transducer stroke is limited by the size of the pressure wave producing member. The stroke length of some of these tools is further limited by the stroke being in the circumferential direction of the pressure wave producing member. There is, therefore, a need for a new and improved downhole tool which overcomes these disadvantages.

In general, it is an object of the present invention to provide a downhole pressure wave generator and method which produce pressure waves of equal amplitude along the length of the pressure wave producing member.

Another object of the invention is to provide a downhole pressure wave generator and method of the above character which produce pressure waves of equal amplitude around the circumference of the pressure wave producing member.

Another object of the invention is to provide a downhole pressure wave generator and method of the above character in which the pressure wave producing member is substantially solid to minimize the effects of downhole pressure on the resonant frequency of the pressure wave producing member.

Another object of the invention is to provide a downhole pressure wave generator and method of the above character in which the actuator for driving the pressure wave producing member is external of the pressure wave producing member.

Another object of the invention is to provide a downhole pressure wave generator and method of the above character in which the direction of stroke of the actuator that drives the pressure wave producing member is along the longitudinal axis of the bore hole.

Another object of the invention is to provide a downhole pressure wave generator and method of the above character in which the pressure wave producing member is made of an elastomeric material.

Additional objects and features of the invention will appear from the following description from which the preferred embodiments are set forth in detail in conjunction with the accompanying drawings.

In general, a pressure wave generator for use down a bore hole having fluid therein adjacent a hydrocarbon-containing formation is provided. The generator includes an elastomeric member sized for disposition in the bore hole and means for exerting a periodic compressive force on the elastomeric member in a first direction so as to cause the elastomeric member to expand in a second direction and thus produce pressure waves in the fluid to increase the effective permeability of the hydrocarbon-containing formation. A method for using the generator is provided.

Figure 1:
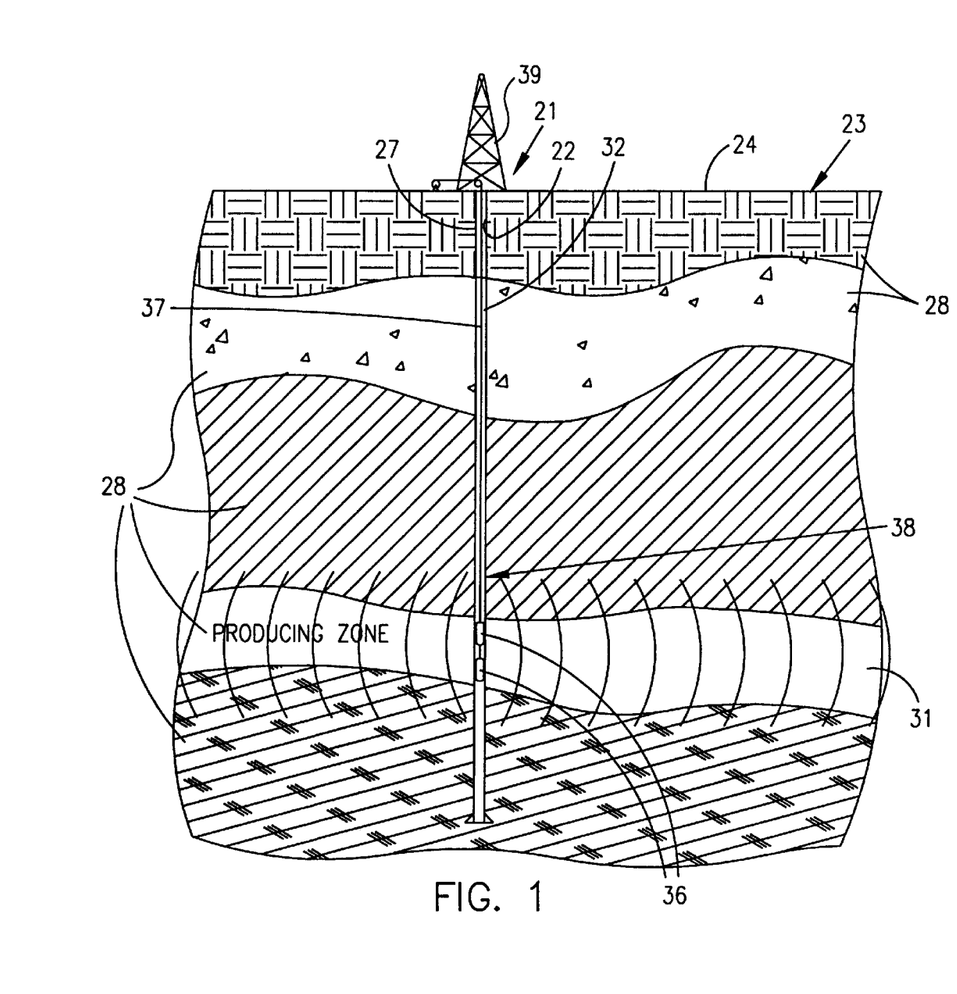
FIG. 1 is a schematic view of a plurality of the pressure wave generators of the present invention in operation in a borehole.

More in particular, the pressure wave generator of the present invention is for use in a hydrocarbon-producing well 21 as shown in FIG. 1. Well 21 includes a bore hole 22 which extends into the earth 23 from ground surface 24. Bore hole 22 is defined by an earthen wall 27 and extends through a plurality of earthen layers 28 which include a hydrocarbon-containing formation or oil producing zone 31. The bore hole 22 has a fluid therein which includes oil 32.

At least one and as shown a plurality of pressure wave apparatus or generators 36 are disposed in longitudinally spaced-apart positions on a cable 37 of a work string 38 in the portion of the bore hole 22 adjacent oil producing zone. Pressure wave generators 36 are secured together by a conventional support line and cable 37 which extends down hole from an above-ground support structure 39 at ground surface 24.

Figure 2:
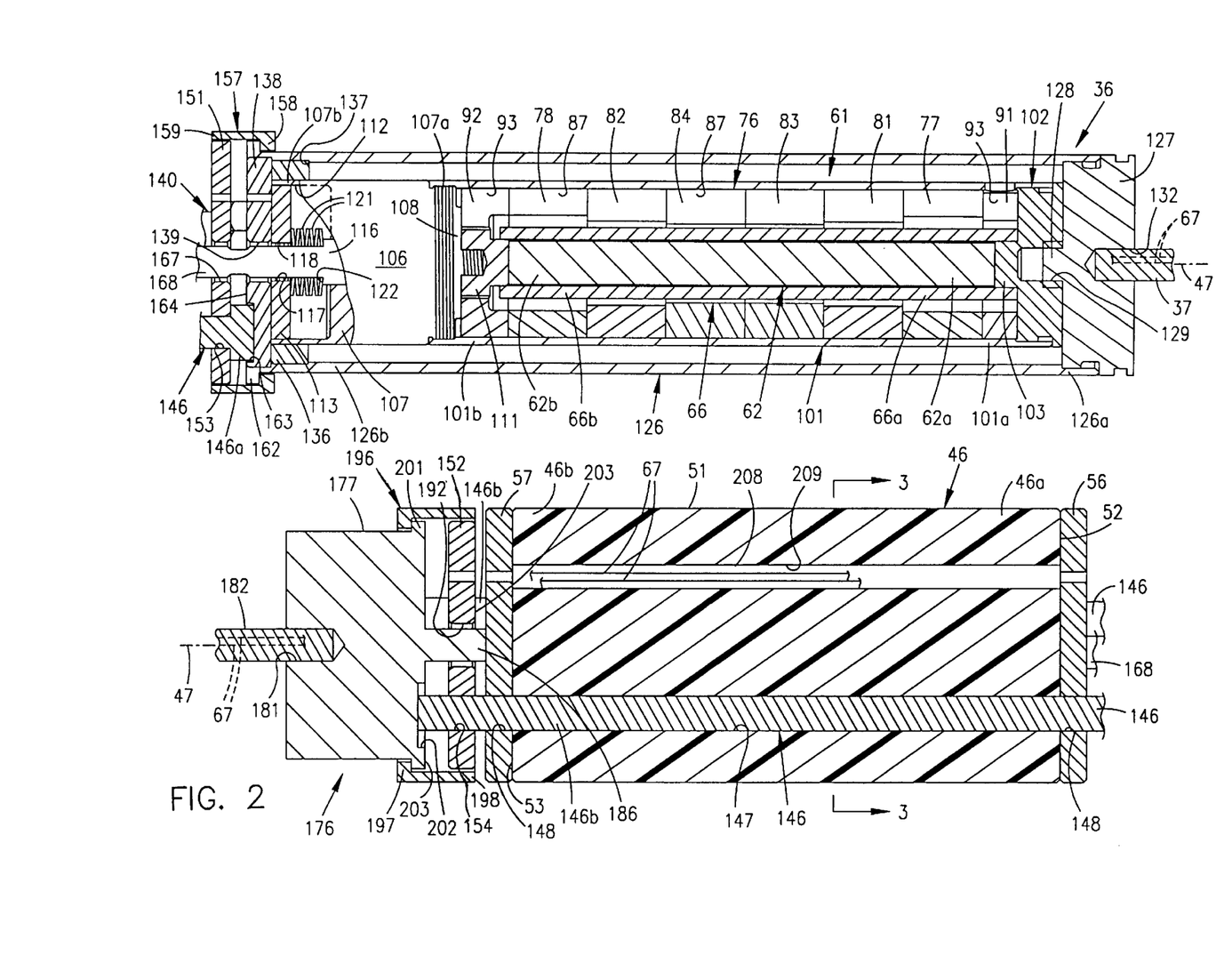
FIG. 2 is a cross-sectional view, somewhat schematic, of a segmented downhole pressure wave generator of FIG. 1.
Figure 3:
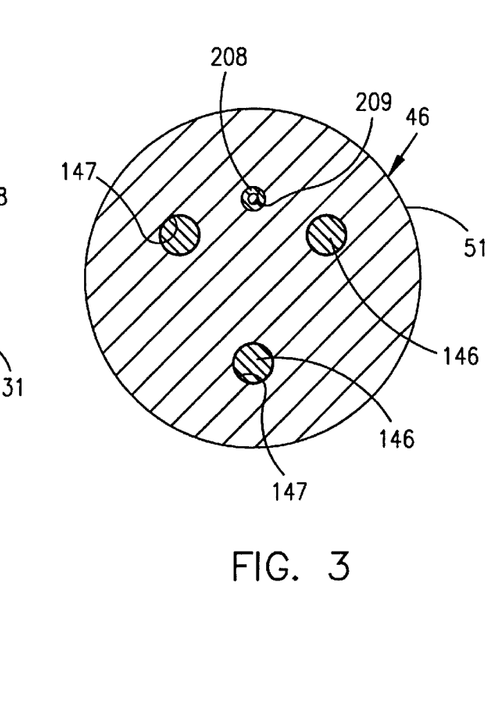
FIG. 3 is a cross-sectional view of a downhole pressure wave generator of FIG. 2 taken along the line 3—3 of FIG. 2.

Each of the pressure wave generators 36 is substantially cylindrical in conformation and has a cross-sectional shape and diameter which are smaller than the cross-sectional shape and diameter of bore hole 22. Each pressure wave generator or acoustic source 36 includes an elongate cylindrical element or member 46 made from any suitable material and preferably any suitable elastomeric material such as rubber. Elongate pressure wave producing member 46 extends along a central longitudinal axis 47, which is coincident with the center line of bore hole 22, and has first and second opposite end portions 46a and 46b. As shown in FIGS. 2 and 3, elongate member or flextensional element 46 is substantially solid in composition and has a circular cross-section perpendicular to longitudinal axis 47. The outer cylindrical surface 51 of elongate member 46 extends parallel to longitudinal axis 47 and first and second spaced-apart end surfaces 52 and 53 extend parallel to each other and perpendicular to longitudinal axis 47. Elongate member 46 is sized so that its length is a ½ wavelength at 250 Hz. The natural frequency of elongate member 46, determined in part by the length of the member 46, is thus optimized at an operating bandwidth of 100 to 400 Hz. More specifically, the elongate member has a length which can range from 1 to 48 inches, preferably from 3 to 16 inches and more preferably from 4 to 12 inches and a diameter which can range from 1 to 8 inches, preferably from 2 to 4 inches and more preferably from 2 to 3.5 inches. First and second spaced-apart end plates or disks 56 and 57 abut first and second end surfaces 52 and 53. Disks 56 and 57 are each made from any suitable material such as steel and have a diameter approximating the diameter of elongate member 56.

Compressing means which includes actuator 61 is included in pressure wave generator 36 for exerting a periodic compressive force on elongate member 46 (see FIG. 2). Motor means or actuator 61 has an active element or drive rod 62 made from a suitable active or smart material which changes shape when energized by being placed in an electromagnetic field. Elongate drive rod 62 has first and second end portions 62a and 62b and extends along longitudinal axis 47. The drive rod 62 is cylindrical in shape and, more specifically, has a circular cross-section. Drive rod 62 can be made from any suitable material such as an electrostrictive material, a piezoelectric material or a magnetostrictive material. A preferred electrostrictive material for drive rod 62 is lead magnesium niobate and its variants and a preferred piezoelectric material is lead zirconate titanate and its variants. A magnetostrictive material, which changes shape in response to an applied magnetic field, is a particularly preferred material. Specifically, piston-like element or drive rod 62 is changeable between a first or shortened shape when in the absence of a magnetic field and a second or elongated shape when in the presence of a magnetic field. A giant magnetostrictive material is preferred because such a material can tolerate high mechanical stress for magnetic moment alignment so as to permit the drive rod 62 to have a relatively high transduction capability. High transduction capability, along with high energy density, enable more mechanical power output from a given electrical power input and volume of smart material and thus reduce the size and weight of actuator 61. Such materials also have inherent high reliability. Preferred giant magnetostrictive materials are rare earth materials, rare earth-transition metal materials and compositions having rare earth materials, transition metals and other elements.

Preferred rare earth materials for operating temperatures ranging from 0° to 200° K are rare earth binary alloys such as $Tb_xDy_{1-x}$, where x ranges from 0 to 1. Other rare earth elements can be added or substituted for either terbium or dysprosium in this base alloy. For example, holmium, erbium or gadolinium can be used in place of either terbium or dysprosium. Other preferred rare earth materials for operating temperatures ranging from 0° to 200° K are body centered cubic intermetallic compounds such as $(Tb_xDy_{1-x})(Zn_yCd_{1-y})$, where x ranges from 0 to 1, y ranges from 0 to 1 and x+y=1. Other rare earth elements, such as holmium, erbium or gadolinium, can be added or substituted for either terbium or dysprosium in these body centered cubic intermetallic compounds.

Preferred rare earth-transition metal materials are rare earth-iron materials such as TERFENOL based alloys. These alloys are suited for operating temperatures ranging from 0° to 700° K. One of these alloys is $TbFe_2$. Particularly preferred rare earth-iron materials for operating in the 0° to 700° K temperature range are disclosed in U.S. Pat. Nos. 4,308,474; 4,609,402; 4,770,704; 4,849,034 and 4,818,304, incorporated herein by this reference, and include the material known as TERFENOL-D sold by ETREMA Products, Inc. of Ames, Iowa. TERFENOL-D is a metal alloy formed from the elements terbium, dysprosium and iron and has the formula of $Tb_xDy_{1-x}Fe_{2-w}$, where x ranges from 0 to 1 and w ranges from 0 to 1. A preferred formula for TERFENOL-D is $Tb_xDy_{1-x}Fe_{1.90-1.95}$, where x ranges from 0.25 to 1.0. A particularly preferred formula for the TERFENOL-D material of drive rod 62 is $Tb_{0.3}Dy_{0.7}Fe_{1.92}$. Other rare earth materials, such as cerium, praseodymium, neodymium, holmium, erbium or gadolinium, can be added or substituted for terbium or dysprosium for property enhancement purposes. For example, a giant magnetostrictive material having the rare earth materials $R^1_{x1}, R^2_{x2}, R^3_{x3} \ldots R^n_{xn}$ can be provided where $R^1, R^2, R^3 \ldots R^n$ constitute rare earth materials and x1+x2+x3+ . . . +xn=1. Other transition metals, such as manganese, cobalt or nickel, can be added or substituted for iron as disclosed in U.S. Pat. No. 5,110,376, incorporated herein by this reference. Elements which are not transition metals, such as aluminum, can also be added or substituted for iron. For example, a giant magnetostrictive material having the elements $T^1_{y1}, T^2_{y2}, T^3_{y3} \ldots T^n_{yn}$ can be provided where $T^1, T^2, T^3 \ldots T^n$ constitute transition metals or elements such as aluminum and y1+y2+y3+ . . . +yn=2−w, and w ranges from 0 to 1. Alternatively, an intermetallic compound can be provided having combinations or variations of TERFENOL-D, such as $(Tb_{x1},Dy_{x2},R^3_{x3},R^4_{x4} \ldots R^n_{xn})(Fe_{y1},T^2_{y2},T^3_{y3} \ldots T^n_{yn})_{2-w}$ where x1+x2+x3+ . . . +xn=1, y1+y2+y3+ . . . +yn=2−w, and w ranges from 0 to 1.

Giant magnetostrictive materials which contract and thus exhibit negative magnetostriction when placed in a magnetic field can be used for the material of drive rod 62 and be within the scope of the present invention. These negative magnetostrictive materials have formulations similar to the giant magnetostrictive materials described above except that they include the rare earth element samarium. Preferred negative magnetostrictive materials for operating temperatures ranging from 0° to 700° K are SAMFENOL based alloys such as $SmFe_2$. A particularly preferred SAMFENOL based alloy is SAMFENOL-D, which is also disclosed in U.S. Pat. Nos. 4,308,474; 4,609,402; 4,770,704; 4,849,034 and 4,818,304 and has the formula $Sm_xDy_{1-x}Fe_{2-w}$, where x ranges from 0 to 1 and w ranges from 0 to 1. Other rare earth materials, such as cerium, praseodymium, neodymium, holmium, erbium or gadolinium, can be added or substituted for samarium or dysprosium in the same manner as discussed above with respect to TERFENOL based alloys. In addition, other transition metals, such as manganese, cobalt or nickel, and elements which are not transition metals, such as aluminum, can be added or substituted for iron in the same manner as also discussed above.

Dynamic magnetic field generation means is provided in actuator 61 for producing an electromagnetic field which extends through at least a portion of drive rod 62 to change the shape of the drive rod 62 (see FIG. 2). In this regard, an elongate tubular means or coil 66 is concentrically disposed about drive rod 62 and is included within the means of actuator 61 for producing a magnetic field through the entire drive rod 62. Excitation or drive coil 66 has first and second end portions 66a and 66b and is circular in cross section. The drive coil 66 has a length approximating the length of drive rod 62 and is made from any suitable conductive material such as fine magnet wire of copper, aluminum, niobium titanium or silver for producing a magnetic field having a flux which extends through the drive rod 62. Means for providing an electrical signal to excitation coil or wire solenoid 66 includes a controller and power supply (not shown) included within support structure 39 and electrically coupled to the coil 66 by means of lead means or wires 67 extending through cable or electric wire line 37 from the support structure 39 to actuator 61. A portion of each of wires 67 is shown in FIG. 2.

Magnetic means or tubular bias magnetic means 76 is provided in actuator 61, as shown in FIG. 2, for continuously biasing drive rod 62. Bias magnetic means 76 is formed from a plurality of tubular magnets concentrically disposed around drive coil 66 and aligned in juxtaposition with each other along the length of the drive coil. First and second annular end magnets 77 and 78 form the first second opposite end portions of bias magnetic means 76. First and second annular intermediate magnets 81 and 82 are disposed inwardly of respective end magnets 77 and 78 and first and second central magnets 83 and 84 are disposed in juxtaposition with each other and inwardly of respective first and second intermediate magnets 81 and 82. The individual magnets 77, 78 and 81–84 of bias magnetic means 76 are each made from a hard magnetic material of any suitable type such as many of the different grades of neodymium iron boron. Alternatively, these magnets can be made from materials such as samarium cobalt or aluminum nickel cobalt.

The individual magnets 77, 78 and 81–84 of bias magnetic means 76 are sized and shaped to produce a uniform DC magnetic field through the drive rod 62. The outer diameters of such individual magnets are approximately equal. In addition, the inner diameters of end magnets 77 and 78 are approximately equal, the inner diameters of intermediate magnets 81 and 82 are approximately equal and the inner diameters of central magnets 83 and 84 are approximately equal. The individual magnets step up in thickness toward the longitudinal center of bias magnetic means 76 so that the radial thicknesses of the bias magnets decrease toward the opposite ends of drive coil 66 and drive rod 62. Specifically, the inner diameters of intermediate magnets 81 and 82 are smaller than the inner diameters of end magnets 77 and 78 and the inner diameters of central magnets 83 and 84 are smaller than the inner diameters of intermediate magnets 81 and 82. The inner diameters of central magnets 83 and 84 are slightly larger than the external diameter of drive coil 66.

The six individual magnets of bias magnetic means 76 have an aggregate length closely approximating the length of drive rod 62. Each of the individual magnets 77, 78 and 81–84 has respective planar end surfaces which extend parallel to each other and is provided with a slit 87 extending radially therethrough. Slits 87 are longitudinally aligned to form a plane extending through longitudinal axis 47 and serve to preclude electrical currents from traveling circumferentially around bias magnetic means 76. Such currents can create unwanted magnetic fields and heat which disrupt the desired performance of actuator 61.

First and second flux return means are included within actuator 61 for capturing the DC magnetic field created by bias magnetic means 76 and directing this DC field through drive rod 62. The first and second flux return means also capture the AC magnetic field generated by drive coil 66 and channel this AC field into drive rod 62. The first and second flux return means include first and second annular rings 91 and 92 concentrically centered on longitudinal axis 47 and disposed on the opposite end surfaces of bias magnetic means 76. Rings 91 and 92 each have an outer diameter approximately equal to the outer diameter of the bias magnetic means 76. Flux return rings 91 and 92 have respective longitudinal dimensions so that when so disposed at the ends of bias magnetic means 76 the rings 91 and 92 extend longitudinally beyond first and second end portions 62a and 62b of drive rod 62. In addition, second flux return ring 92 extends longitudinally beyond the respective end of drive coil 66. Each of rings 91 and 92 is provided with a slit 93 extending radially therethrough and aligned in the plane of slits 87. Slits 93 serve to preclude electrical currents from traveling circumferentially around the rings 91 and 92 for the same reasons discussed above with respect to slits 87.

First and second flux return rings 91 and 92 are each made from any suitable ferromagnetic or soft magnetic material having a relatively low electrical conductivity and a relatively high electrical resistivity. The flux return rings 91 and 92 also have a relatively high magnetic saturation flux density. It is preferred that the material of rings 91 and 92 has an electrical resistivity greater than 1000 ohm-cm, although a more practical electrical resistivity range is between 0.01 to 1000 ohm-cm. It is preferable that the magnetic saturation flux density be greater than 8,000 gauss, more preferably greater than 12,000 gauss and most preferably greater than 20,000 gauss. A suitable material for rings 91 and 92 is the material marketed under the trade name High Flux by Arnold Engineering of Marengo, Ill. and by Magnetics of Butler, Pa. High Flux is a nickel and iron alloy having the composition of 0.5 nickel and the balance iron. The nickel and iron elements of the High Flux material are ground into micron and sub-micron particle sizes. A dielectric is sprayed on the particles to electrically insulate them and that powder mix is compressed at roughly 200 tons per square inch to make a solid component. Another suitable material is iron powder marketed by MMG-North America of Paterson, N.J. The iron powder has a composition of greater than 95% iron. The iron powder is produced in a manner similar to the method described above for producing High Flux. Briefly, the iron elements are ground into micron and sub-micron particle sizes. A dielectric is sprayed on the particles to electrically insulate them and that powder mix is compressed to make a solid component which is the equivalent of a sandstone structure. Each of these materials has an electrical resistivity ranging from 0.01 to 50 ohm-cm and a magnetic saturation flux density ranging from 12,000 to 15,000 gauss. High Flux has a high relative permeability which makes it a good magnetic flux conductor.

Drive rod 62, drive coil 66, bias magnetic means 76 and first and second flux return rings 91 and 92 are contained in an inner tubular member or actuator housing 101 made from any suitable material such as steel. Tubular housing 101 has an inner diameter slightly larger than the outer diameter of bias magnetic means 76 and flux return rings 91 and 92 so as to snugly retain the bias magnetic means 76 and flux return rings 91 and 92 in proper relative alignment with each other and longitudinal axis 47. Housing 101 has first and second end portions 101a and 101b and is concentrically centered on the longitudinal axis 47. A disk-shaped end connector 102 is threadably secured into first end portion 101a of the actuator housing. The cylindrical end connector 102 has a planar face from which a central cylindrical protuberance 103 centered on longitudinal axis 47 extends. Protuberance 103 seats within first end portion 62a of drive coil 66 and has a planar end surface which abuts first end portion 62a of drive rod 62 so as to longitudinally support the drive rod 62 within drive coil 66. The first end portion of drive coil 66 and first flux return ring 91 extend around protuberance 103 and abut the planar face of end connector 102 from which protuberance 103 extends.

A stroke amplifier 106 is optionally included in actuator 61 for increasing its stroke beyond the amount by which drive rod 62 changes in length under the influence of drive coil 66. Stroke amplifier 106 can be of any conventional type such as an hydraulic stroke amplifier and preferably a Bernoulli-type hydraulic stroke amplifier. The stroke amplifier 106 has a cylindrical body 107, partially cut-away in FIG. 2, with first and second end portions 107a and 107b. Body 107 is centered on longitudinal axis 47. First end portion 107a is threadably secured into second end portion 101b of actuator housing 101. A cylindrical input piston 108 extends from first end portion 107a and is threadably connected to a cylindrical push rod base 111 made from 416 stainless steel or any other suitable material. Base 111 is disposed within the tubular second flux return ring 92 and has a portion of reduced diameter which extends into second end portion 66b of drive coil 66 and abuts second end portion 62b and drive rod 62. A planar end surface of push rod base 111 is disposed perpendicular to longitudinal axis 47 and engages drive rod 62. Body 107 is provided with a recess 112 concentrically formed about longitudinal axis 47 in second end portion 107b. A containment disk 113 is threaded into recess 112 to form the end wall of the recess 112 and the second end of stroke amplifier 106. A cylindrical output piston 116 extends along central longitudinal axis 47 through recess 112 and a central bore 117 provided in containment disk 113. Bearings 118 are press fit or otherwise suitably secured within bore 117 for facilitating longitudinal movement of output piston 116 in bore 117.

Means is included within actuator 61 for imparting a preload on drive rod 62 and includes a plurality of Belleville springs 121 concentrically disposed around output piston 116 within recess 112. Springs 121, longitudinally aligned end-to-end along a portion of piston 116, are supported at one end by containment disk 113. The other end of springs 121 rests against a shoulder 122 provided in output piston 116. Belleville springs 121 are placed in compression between containment disk 113 and shoulder 122 and impart a longitudinal force on piston 116 which is transmitted through the internal fluid of stroke amplifier 106 to input piston 108. This preload force is in turn transmitted by the input piston 108 through push rod base 111 to drive rod 62.

Actuator 61 is carried longitudinally within a tubular member or outer housing 126 concentrically centered on central longitudinal axis 47. Outer housing 126 has first and second end portions 126a and 126b and is made from steel or any other suitable material. A disk-shaped end cap 127 made from steel or any other suitable material is threadably secured to first end portion 126a of outer housing or shell 126. Shell end cap 127 is formed with a central stud 128 which cooperatively threads into a bore 129 extending longitudinally into the center of end connector 102. Shell end cap 127 thus serves to secure actuator 61 within outer shell 126 in a position centered on central longitudinal axis 47. Shell end cap 127 is provided with a conventional rope socket 132, shown schematically in FIG. 2, which permits pressure wave generator 36 to be removably secured to support line and cable 37. An annular spacer ring 136 made from any suitable material such as steel seats against an annular shoulder 137 provided inside second end portion 126b of outer shell 126. Ring 136 concentrically engages the outside of stroke amplifier 106 to center the stroke amplifier and thus second end portion of actuator 61 on central longitudinal axis 47. A locking disk 138 made from steel or any other suitable material is threaded into second end portion 126b of outer shell 126. Locking disk 138 urges spacer ring 136 against shoulder 137 and also engages body 107 of stroke amplifier 106 to longitudinally retain both the stroke amplifier and actuator 61 within outer shell 126. Output piston 116 extends through a central bore 139 provided in locking disk 138. Outer shell 126 is suitably sized and has sufficient strength so as to carry the longitudinal forces necessary to support elongate member 46 and any additional pressure wave generators 36 or downhole elements below the outer shell 126.

Outer shell 126 is included within the means for securing actuator 61 to elongate member 46. This securing means further includes a plurality of three longitudinally-extending tie rods 146 which extend through elongate member 46 and first and second end disks 56 and 57. Each of tie rods 146 has a first end portion in the form of enlarged head 146a and a second end portion in the form of threaded end 146b. Elongate member 46 is provided with three bores 147 extending longitudinally therethrough for receiving the tie rods 146. As can be seen from FIG. 3, bores 147 and thus tie rods 146 are circumferentially disposed about central longitudinal axis 47 at separation angles of approximately 120°. Each of first and second end disks 56 and 57 is provided with three bores 148 extending between the planar end surfaces of the disk. Bores 148 are circumferentially disposed about axis 47 in alignment with bores 147 in elongate member 46.

Tie rods 146 further extend through first and second disk-shaped connector caps 151 and 152, each made from steel or any other suitable material. First connector cap 151 has a plurality of three bores 153 extending between the planar end surfaces thereof for receiving the tie rods 146. Bores 153 are aligned with bores 148 in first end disk 56. The first connector cap 151 is spaced apart from first end disk 56 and is disposed between the tie rod heads 146a and the end disk 56. Second connector cap 152 is provided with a plurality of three threaded bores 154 which extend through the planar end surfaces of cap 152 and are threaded to threadably receive threaded ends 146b of tie rods 146. Bores 154 are aligned with bores 148 in second end disk 57. Second connector cap 152 is spaced apart from second end disk 57.

A first tubular connector ring 157 made from any suitable material such as steel serves to secure first connector cap 151 to outer shell 126. Connector ring 157 is internally sized so as to slide over first end portion 126a of the outer shell. The first end of connector ring 157 is formed with an internal flange 158 which extends radially inwardly toward longitudinal axis 47. The second or opposite end 159 of connector ring 157 is internally threaded. Second end portion 126b of outer shell 126 is formed with an outwardly extending annular flange or upset 162 which extends radially outwardly from longitudinal axis 47. Flange 158 and upset 162 are diametrically sized so that the flange 158 longitudinally engages upset 162 for limiting the longitudinal travel of first connector ring 157 on outer shell 126. First connector cap 151 is externally threaded so as to cooperatively thread within threaded end 159 of the first connector ring 157.

Locking disk 138 is provided with a plurality of three recesses 163 in planar surface or face 164 thereof. Recesses 163 are sized and circumferentially disposed around longitudinal axis 47 to cooperatively receive tie rod heads 146a so as to rotatably lock first connector cap 151 relative to the locking disk 138 during the rotational securement of first connector ring 157 to the first connector cap 151. The longitudinal movement of first connector ring 157 during such tightening is limited by the sandwiching of tie rod heads 146a between first connector cap 151 and locking disk 138. A central bore 167 is provided in first connector cap 151 for permitting output piston 116 to extend through the connector cap 151. The output piston 116 is longitudinally sized so that its distal or free end 168 engages first end disk 56 when first connector ring 157 is rotatably secured to first connector cap 151 and drive rod 62 is in a relaxed or unenergized state. Tie rods 146 are longitudinally sized so that elongate member 46 is in a relatively uncompressed state when drive rod 62 is in its unenergized state. The output piston 116 has a sufficient column strength so as to not bend when in compression under the force of drive rod 62.

Pressure wave generator 36 is provided with a coupling assembly 176 for permitting downhole components to be attached to generator 36 and for providing a reactive force to the compressive force exerted by output piston 116 on elongate member 46. Coupling assembly 176 includes a cylindrical member or base cap 177 made from steel or any other suitable material. Base cap 177 is provided with a conventional rope socket 181 substantially similar to rope socket 132 for removably attaching a downhole support line and cable 182 substantially similar to line and cable 37. A longitudinally-extending post or stud 186 is formed integral with base cap 177 and centered on longitudinal axis 47. Stud 186 extends through a central bore 192 provided in second connector cap 152 so as to engage and abut second end disk 57.

A second connector ring 196 substantially identical to first connector ring 157 is included in coupling assembly 176 to secure base cap 177 to second connector cap 152 and thus elongate member 46. The second connector ring 196 is formed with an internal flange 197 and a threaded end 198. Base cap 177 is formed with an annular upset 201 substantially similar to annular upset 162 for limiting the longitudinal travel of second connector ring 196 on the base cap 177. The threaded end 198 of second connector ring 196 threadably secures about the threaded periphery of second connector cap 152 to secure coupling assembly 176 to the connector cap 152. Base cap 177 is provided with a plurality of three recesses 202 in planar end surface or face 203 thereof. Recesses 202 are sized and circumferentially disposed so as to receive the portions of tie rod threaded ends 146 extending beyond second connector cap 152. Base cap 177 is thus rotatably locked relative to second connector cap 152 during tightening of second connector ring 196 about the connector cap 152. The take-up of second connector ring 196 about second connector cap 152 is limited by the seating of tie rod threaded ends 146*b* in recesses 202.

Pressure wave generator 36 is provided with a passage extending longitudinally therethrough for permitting electrical and other wires, for pressure wave generators or other devices down hole of pressure wave generator 36, to extend longitudinally through the pressure wave generator 36. Only a portion of such passage is shown in FIGS. 2 and 3. In this regard, an opening is provided in first end portion 101*a* of actuator housing 101 and locking disk 138 and first connector cap 151 are provided with respective bores extending through the respective planar surfaces thereof. As shown in FIGS. 2 and 3, a metal tube 208 is disposed in a bore 209 extending longitudinally through elongate member 46. The internal passageway within tube 208 communicates with respective bores provided in first and second end disks 56 and 57. Longitudinally-extending bores are respectively provided in connector caps 151 and 152 and locking disk 138.

Pressure wave generator 36 preferably includes a conventional fluid isolation pressure balanced system (not shown) to accommodate the hydrostatic pressure in bore hole 22.

In operation and use, actuator 61 is driven by an alternating signal provided to support line and cable 37 by the controller and power supply included within support structure 39. Any suitable signal, such as a signal having a frequency ranging from 100 to 400 Hz, can be provided to actuator 61. As more fully described in U.S. patent application Ser. No. 08/855,228 filed May 13, 1997, now abandoned, the electrical input signal causes drive rod 62 to longitudinally extend and retract at the frequency of the electrical input signal. In general, the electrical input signal from the controller and power supply causes drive coil 66 to generate a magnetic field about the drive coil having a strength, phase and rate of change of polarity corresponding to the amplitude, phase and frequency of the electrical input signal. Drive coil 66 is sized and shaped and positioned relative to the drive rod 62 so that the magnetic field generated thereby preferably extends through the entire drive rod 62. The magnetic field causes the magnetostrictive drive rod 62 to change shape or strain. More specifically, the magnetic moments in the magnetostrictive material of the drive rod align with longitudinal axis 47 when a magnetic field parallel to axis 47 is applied to drive rod 62.

Belleville springs 121 serve to create a longitudinal preload on drive rod 62 which remains constant throughout the actuation and deactuation of the drive rod 62. The magnitude of this preload is determined by the distance which containment disk 113 is threaded longitudinally into body 107 of stroke amplifier 106. The preload externally causes the magnetic moments to be more perfectly oriented perpendicular to longitudinal axis 47. The permanent magnets 77, 78 and 81–84 of bias magnetic means 76 are sized, shaped and positioned relative to the drive rod 62 to provide a uniform DC magnetic field which extends through the entire drive rod 62. The changing magnetic field produced by drive coil 66 causes the drive rod 62 to dynamically expand from a first or statically biased or home position to a second or elongated position and relax back to its home position at the frequency of the electrical input signal. The uniformity of the magnetic bias through drive rod 62 is enhanced by the use of flux return rings 91 and 92, which also serve to capture the AC magnetic field created by drive coil 66 and channel that field through the drive rod 62 so as to increase the AC magnetic field intensity in the drive rod and thus enhance the performance of actuator 21.

The extension and retraction of drive rod 62 causes push rod base 111 to move longitudinally within outer shell 126. Each stroke of the push rod base is amplified by stroke amplifier 106 and results in a corresponding amplified stroke of output piston 116. Each extension of drive rod 62 thus causes output piston 116 to move first end disk 56 toward second end disk 57 to compress elongate member 46 along longitudinal axis 47. Cylindrical stud 186 provides an equal and opposite reaction force to second end disk 57 which precludes disk 57 from moving away from first end disk 56 during the compression of elongate member 46. The decrease in length of elongate member 46 causes the outer diameter and cylindrical outer surface of the elongate member 46 to correspondingly increase. The relatively solid composition of the elongate member 46 and the snug fit of tie rods 146 within bores 147 and tube 208 within bore 209 minimizes internal expansion of the elongate member 46 during its compression so as to maximize the expansion of the external diameter and outer cylindrical surface of elongate member 46.

The expansion and contraction of the outer cylindrical surface of elongate member 46 causes pressure pulses to be radially transmitted from elongate member 46 through oil 32 and bore hole 22. The frequency of the electrical input signal desirably corresponds to the natural frequency of elongate member 46 so as to optimize the performance of the elongate member 46 and thus maximize the amplitude of the pressure waves produced by generator 36. The substantially solid composition of elongate member 46 and the cylindrical shape of the elongate member cause the pressure pulses or waves created along the length of elongate member 46 to have a substantially equal amplitude. The circular cross-section of elongate member 46 causes pressure waves transmitted in each direction around elongate member 46 to have a substantially equal amplitude. Accordingly, desirable high pressure waves can be transmitted both along the length and around the circumference of elongate member 46 into oil producing zone 31. This acoustic energy reduces surface tension within oil producing zone 31 and increases the effective permeability of the zone 31 so as to cause oil 32 to flow more easily into bore hole 22.

The relatively solid elongate member 46 has a high energy density for permitting it to expand and contract at its natural frequency regardless of the external hydrostatic pressure experienced by the elongate member in bore hole 22. Unlike a hollow structure, elongate member 46 is less susceptible to pressure changes resulting from the movement of pressure wave generator 36 longitudinally within bore hole 22. As a result, generator 36 can be more easily operated at its natural frequency regardless of the hydrostatic pressure in bore hole 22 below ground surface 24.

The radial displacement of elongate member 46 is not limited by the stroke of actuator 61 since the axial stroke of the actuator 61 can be amplified between the actuator 61 and the elongate member 46. In addition, the disposition of actuator 61 along the longitudinal axis of bore hole 22 permits the overall size and length of the actuator to be larger than if the actuator were disposed perpendicularly of the longitudinal axis. The placement of the actuator 61 outside of elongate member 46 removes the size of the elongate member as a limitation on the size of the actuator.

A giant magnetostrictive material, such as TERFENOL-D, is a particularly desirable material for actuator 61 and the smart material of drive rod 62. The large magnetomechanical losses of a giant magnetostrictive material enhance its capability for passive damping. The high thermal conductivity of the material permits adequate heat removal. In addition, the performance of the material can be tailored by modifying easily adjustable operating conditions, resulting in a large potential design space for a given application. Giant magnetostrictive materials such as TERFENOL-D are also advantageous because of their reversible characteristics; that is, they are efficient at converting magnetic energy to mechanical energy and at converting mechanical energy to magnetic energy. In this regard, and as more fully described in copending U.S. patent application Ser. No. 09/004,581 filed Jan. 8, 1998, it should be appreciated that coil 66 and/or an additional coil can be provided for sensing and/or damping the movement of drive rod 62 and be within the scope of the present invention.

Pressure wave generator 36 provides that the load path and forces from the weight of other apparatus down hole of generator 36 in the work string 38 are carried by outer shell 126 and tie rods 146. As a result, the periodic compressive force exerted by actuator 61 on elongate member 46 is independent of the weight or force of the downhole apparatus. The overall performance of pressure wave generator 36 is thus more predictable and controllable.

Although only a single pressure wave generator 36 can be utilized in the method of the present invention, the net effect of the pressure wave field intensity from a plurality of longitudinally spaced-apart generators 36 in work string 38 is additive. For example, if five generators 36 are installed end-to-end on work string 38 and are operated in phase, the energy intensity measured at some point in a far field from the bore hole 22 is five times as great as if one generator 36 is provided on the work string. Alternatively, multiple generators 36 on a work string 38 can be operated with some phase difference to optimize the effect of the energy emission at some point in a near field relative to the bore hole 22.

Figure 4:
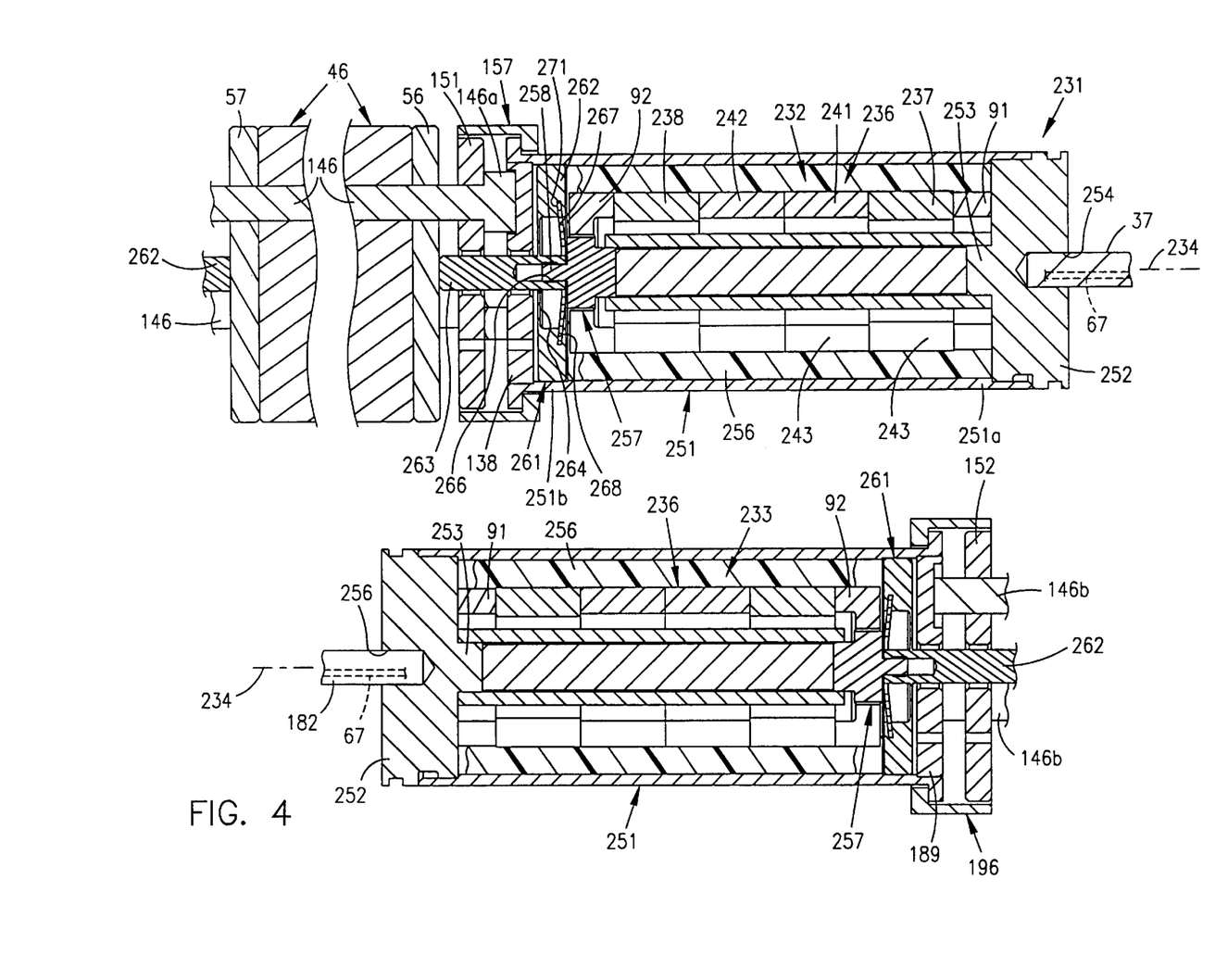
FIG. 4 is a cross-sectional view, somewhat schematic and segmented, of another embodiment of the downhole pressure wave generator of the present invention.

It should be appreciated that the pressure wave generator of the present invention can have other embodiments. For example, a pressure wave generator 231 having similarities to pressure wave generator 36 is shown in FIG. 4. Like reference numerals have been used in FIG. 4 to describe like components of pressure wave generators 231 and 36. In general, first and second motor means or actuators 232 and 233, each substantially similar to actuator 61, are carried by opposite ends of elongate member 46 for providing substantially equal and opposite compressive forces to the ends of elongate member 46. First and second actuators 232 and 233 are each longitudinally centered on central longitudinal axis 234 of pressure wave generator 231.

In addition to drive rod 62 and drive coil 66, first actuator 232 includes tubular bias magnetic means 236 formed from a plurality of individual tubular magnets concentrically disposed about drive coil 66 and aligned in juxtaposition with each other along the length of the drive coil 66. First and second annular end magnets 237 and 238 form the first and second opposite end portions of bias magnetic means 236. First and second central magnets 241 and 242 are disposed in juxtaposition with each other and inwardly of respective first and second end magnets 237 and 238. The magnets of bias magnetic means 236 are made from the same material as the magnets of bias magnetic means 76 described above. Individual magnets 237, 238, 241 and 242 are sized and shaped to produce a uniform DC magnetic field through the drive rod 62. The outer diameters of individual magnets 237, 238, 241 and 242 are approximately equal, however the equal inner diameters of first and second end magnets 237 and 238 are smaller than the equal inner diameters of first and second central magnets 241 and 242. As such, first and second end magnets 237 and 238 have a radial thickness which is greater than the radial thickness of first and second central magnets 241 and 242. Each of magnets 237, 238, 241 and 242 is provided with a radially extending slit 243 substantially similar to slits 87 described above. Slits 243 are aligned in a plane extending through central longitudinal axis 234.

First actuator 232 does not include an actuator housing similar to actuator housing 101 of actuator 61 nor an end connector similar to end connector 102 of the actuator 61. Nor does first actuator 232 include a stroke amplifier.

Drive rod 62, drive coil 66, bias magnetic means 236 and first and second flux return rings 91 and 92 of first actuator 232 are disposed within an outer housing or shell 251 substantially similar to outer shell 126. Outer shell 251 has first and second end portions 251a and 251b substantially similar to first and second end portions 126a and 126b. A shell end cap 252 substantially similar to shell end cap 127 is threadably secured into first end portion 251a. Shell end cap 252 is provided with a cylindrical stud 253 extending from the center thereof along longitudinal axis 234. Stud 253 seats within first end portion 66a of drive coil 66 in substantially the same manner as protuberance 103 described above. Shell end cap 252 is further provided with a rope socket 254 substantially similar to rope socket 132 for removably attaching support line and cable 37 to pressure wave generator 231. An epoxy or resin 256 is disposed between housing 251 and tubular bias magnetic means 236 and flux return rings 91 and 92 for retaining the tubular magnetic means and flux return rings in the housing.

A cylindrical push rod base 257 substantially similar to push rod base 111 is disposed within second flux return ring 92 and has a portion of reduced diameter which extends into second end portion 66b of drive coil 66 to abut second end portion 62b of the drive rod 62. Push rod base 257 has a cylindrical threaded stud 258 which extends from the center thereof toward locking disk 138.

An internal disk or flexure head 261 is threaded into second end portion 251b of outer shell 251 inside locking disk 138. Head 261 includes an outer ring 262 and a cylindrical post or stud 263 secured to ring 262 be means of a radially-extending annular membrane 264. Stud 263 extends from the center of head 261 along longitudinal axis 234 through central bore 139 of locking disk 138 and central bore 167 of first connector cap 151 to engage first end disk 56. A threaded central bore 266 extends longitudinally into the back end of flexure head 261 and is internally threaded to receive the externally threaded cylindrical stud 258 of push rod base 257. A conventional Belleville spring 267 is disposed within a recess 268 provided in the back side of flexure head 261. Belleville spring 267 presses against an annular shoulder 271 provided on push rod base 257 for imparting a preload to drive rod 62 in the same manner as Belleville springs 121. Thin membrane 264 of flexure head 261 permits movement of stud 263, and thus push rod base 257, along longitudinal axis 234 relative to ring 262. Push rod base 257 and cylindrical stud 263 serve to transmit to first end disk 56 the longitudinal force exerted from the extension of drive rod 62 against push rod base 257.

Second actuator 233 is substantially identical to first actuator 232 and like reference numerals have been used to describe like components between first and second actuators 232 and 233.

In operation and use of pressure wave generator 231, each of first and second actuators 232 and 233 are driven in phase by identical electrical signals provided by the controller and power supply within support structure 39. The drive rod 62 of first and second actuators 232 and 233 thus extend and retract in unison to provide a periodic compressive force along longitudinal axis 234 to elongate member 46. The resulting periodic longitudinal compression and simultaneous radial expansion of elongate member 46 produces pressure waves or pulses substantially identical to those produced by pressure wave generator 36.

The pressure wave generators herein can be provided without prestressing or preloading means, flux return elements and/or DC magnetic biasing means and be within the scope of the present invention. In addition, the DC magnetic biasing means described herein can have other constructions, tubular or otherwise, or be constructed without the use of permanent magnets. For example, one of the coils disposed around the magnetostrictive drive rod can be provided with a DC current, separately or in combination with an AC current, to produce the DC magnetic field through the drive rod. It should be further appreciated that the transducers herein can have other embodiments including less than all of the components described herein and be within the scope of the present invention. The pressure wave generators can also be constructed with actuators of other construction and type, providing a stroke along the longitudinal axis of the generator or otherwise.

Alternate means for providing power to the downhole pressure wave generators of the present invention can be provided. For example, power being transmitted down hole to another device, such as 408 volt three phase for a pump, can be transformed into the desired form for use with the pressure wave generator of the present invention, such as 400 Hz single phase. The control signal would be used to adjust the frequency of operation of the device.

From the foregoing, it can be seen that a downhole pressure wave generator has been provided which produces pressure waves of equal amplitude around the circumference of the pressure wave producing member. The pressure wave producing member is substantially solid to minimize the effects of downhole pressure on the resonant frequency of the pressure wave producing member. An actuator for driving the pressure wave producing member is external of the pressure wave producing member and the direction of stroke of the actuator is along the longitudinal axis of the bore hole. The pressure wave producing member is made of an elastomeric material.

What is claimed is:

1. A pressure wave generator for use down a bore hole having fluid therein comprising an elastomeric member sized for disposition in the bore hole and means for exerting a periodic compressive force on the elastomeric member in a first direction so as to cause the elastomeric member to expand in a second direction and thus produce pressure waves in the fluid.

2. The pressure wave generator of claim 1 wherein the elastomeric member is cylindrical in shape and has a longitudinal axis.

3. The pressure wave generator of claim 2 wherein the elastomeric member is circular in cross section.

4. The pressure wave generator of claim 2 wherein the means for exerting a compressive force on the elastomeric member includes means for exerting a compressive force along the longitudinal axis of the cylinder.

5. The pressure wave generator of claim 1 wherein the elastomeric member has a length and has a shape for generating pressure waves of a substantially equal amplitude along its length.

6. The pressure wave generator of claim 1 wherein the elastomeric member is made of rubber.

7. The pressure wave generator of claim 1 wherein the elastomeric member is substantially solid.

8. The pressure wave generator of claim 1 wherein the elastomeric member has a natural frequency and a high energy density for permitting the elastomeric member to expand and contract at the natural frequency regardless of the external pressure experienced by the elastomeric member in the bore hole.

9. A pressure wave generator for use down a bore hole having fluid therein comprising a substantially solid cylindrical member of an elastomeric material having a longitudinal axis and first and second opposite end portions, the cylindrical member having a length and a cross-sectional size for disposition in the bore hole and motor means carried by at least one of the first and second end portions for exerting a periodic compressive force along the longitudinal axis of the cylindrical member so as to cause the cylindrical member to expand radially along its length and thus produce pressure waves in the fluid.

10. The pressure wave generator of claim 9 wherein the motor means includes an active element changeable from a first shape to a second shape in the presence of an electromagnetic field and means for producing an electromagnetic field which extends through at least a portion of the active element to change the shape of the active element.

11. The pressure wave generator of claim 10 wherein the active element is made from a magnetostrictive material and wherein the means for producing an electromagnetic field includes means for producing a magnetic field which extends through at least a portion of the active element.

12. The pressure wave generator of claim 11 wherein the active element is made from a rare earth-iron magnetostrictive material.

13. The pressure wave generator of claim 12 wherein the active element has the composition $Tb_xDy_{1-x}Fe_{1.90-1.95}$, where x ranges from 0.25 to 1.0.

14. The pressure wave generator of claim 11 wherein the active element is a rod and wherein the means for producing a magnetic field includes a coil concentrically disposed about the rod.

15. The pressure wave generator of claim 9 wherein the motor means is carried by the first end portion of the cylindrical member, further comprising an additional motor means for exerting a periodic compressive force along the longitudinal axis of the cylindrical member, the additional motor means being carried by the second end portion of the cylindrical member.

16. The pressure wave generator of claim 9 wherein the cylindrical member is circular in cross section.

17. A method for increasing the effective permeability of a hydrocarbon-containing formation adjacent a fluid-containing bore hole with an elongate member of an elastomeric material having first and second end portions and extending along a longitudinal axis comprising the steps of disposing the elongate member in the bore hole adjacent the hydrocarbon-containing formation and periodically compressing the elongate member along the longitudinal axis to cause the elongate member to produce pressure waves extending outwardly from the longitudinal axis into the hydrocarbon-containing formation.

18. A method as in claim 17 wherein the periodically compressing step includes periodically compressing the elongate member at a frequency equal to the natural frequency of the elongate member.

19. A method as in claim 17 wherein the periodically compressing step includes periodically compressing the elongate member along the longitudinal axis to cause the elongate member to produce pressure waves of approximately equal amplitude extending outwardly from the longitudinal axis along the length of the elongate member.

20. A method as in claim 17 wherein the periodically compressing step includes periodically compressing the elongate member along the longitudinal axis to cause the elongate member to produce pressure waves of approximately equal amplitude extending outwardly from the longitudinal axis around the circumference of the elongate member.

21. A pressure wave generator for use down a bore hole having fluid therein comprising a solid member sized for disposition in the bore hole and means for exerting a periodic compressive force on the solid member in a first direction so as to cause the solid member to expand in a second direction and thus produce pressure waves in the fluid.

22. The pressure wave generator of claim 21 wherein the solid member is cylindrical in shape and has a longitudinal axis.

23. The pressure wave generator of claim 22 wherein the solid member is circular in cross section.

24. The pressure wave generator of claim 22 wherein the means for exerting a compressive force on the solid member includes means for exerting a compressive force along the longitudinal axis of the cylinder.

25. The pressure wave generator of claim 21 wherein the solid member has a length and has a shape for generating pressure waves of a substantially equal amplitude along its length.

26. The pressure wave generator of claim 21 wherein the solid member is made from an elastomeric material.

27. The pressure wave generator of claim 26 wherein the elastomeric material is rubber.

28. The pressure wave generator of claim 21 wherein the solid member has a natural frequency and a high energy density for permitting the solid member to expand and contract at the natural frequency regardless of the external pressure experienced by the solid member in the bore hole.

* * * * *